United States Patent
Hart-Predmore et al.

(10) Patent No.: US 6,436,561 B1
(45) Date of Patent: Aug. 20, 2002

(54) METHANOL TAILGAS COMBUSTOR CONTROL METHOD

(75) Inventors: David J. Hart-Predmore; William H. Pettit, both of Rochester, NY (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/565,853

(22) Filed: May 5, 2000

Related U.S. Application Data

(63) Continuation-in-part of application No. 09/358,080, filed on Jul. 21, 1999, now abandoned.

(51) Int. Cl.[7] .............................. H01M 8/00; H01M 8/04
(52) U.S. Cl. .............................. 429/12; 429/13; 429/24
(58) Field of Search .............................. 429/12, 13, 22, 429/23, 24, 25, 20, 17, 19, 26; 324/425, 429, 433

(56) References Cited

U.S. PATENT DOCUMENTS

| | | |
|---|---|---|
| 4,128,700 A | 12/1978 | Sederquist |
| 4,293,315 A | 10/1981 | Sederquist |
| 4,555,454 A | 11/1985 | Shuster |
| 4,642,272 A | 2/1987 | Sederquist |
| 4,650,727 A | 3/1987 | Vanderborgh et al. |
| 4,659,634 A | 4/1987 | Struthers |
| 4,670,359 A | 6/1987 | Beshty et al. |
| 4,678,723 A | 7/1987 | Wertheim |
| 4,816,353 A | 3/1989 | Wertheim et al. |
| 4,923,768 A | 5/1990 | Kaneko et al. |
| 4,994,331 A | 2/1991 | Cohen |
| 5,248,567 A | 9/1993 | Amemiya et al. |
| 5,271,916 A | 12/1993 | Vanderborgh et al. |
| 5,272,017 A | 12/1993 | Swathirajan et al. |
| 5,316,871 A | 5/1994 | Swathirajan et al. |
| 5,340,663 A * | 8/1994 | Buswell et al. ................ 429/17 |
| 5,372,617 A | 12/1994 | Kerrebrock et al. |
| 5,401,589 A * | 3/1995 | Palmer et al. ................ 429/13 |
| 5,429,886 A | 7/1995 | Struthers |
| 5,482,791 A * | 1/1996 | Shingai et al. ................ 429/23 |
| 5,484,577 A | 1/1996 | Buswell et al. |
| 5,484,666 A | 1/1996 | Gibb et al. |
| 5,518,705 A | 5/1996 | Buswell et al. |

(List continued on next page.)

OTHER PUBLICATIONS

Szaniszlo, "The Advanced Low–Emissions Catalytic–Combustor Program: Phase I—Description and Status," ASME #79–GT–192 Mar. 1979.

Krill et al., "Catalytic Combustion for System Applications," ASME #79–HT–54 Aug. 1979.

Hall et al., "A Porous Media Burner for Reforming Methanol for Fuel Cell Powered Electric Vehicles," SAE Paper #950095 Feb. 3, 1995.

Natural Gas Power Plant System (a descriptive drawing) date not available.

Primary Examiner—Stephen Kalafut
Assistant Examiner—R. Alejandro
(74) Attorney, Agent, or Firm—Karl F. Barr, Jr.; Cary W. Brooks; Linda M. Deschere

(57) ABSTRACT

A method for controlling the power and temperature and fuel source of a combustor in a fuel cell apparatus to supply heat to a fuel processor where the combustor has dual fuel inlet streams including a first fuel stream, and a second fuel stream of anode effluent from the fuel cell and reformate from the fuel processor. In all operating modes, an enthalpy balance is determined by regulating the amount of the first and/or second fuel streams and the quantity of the first air flow stream to support fuel processor power requirements.

26 Claims, 7 Drawing Sheets

U.S. PATENT DOCUMENTS

| | | |
|---|---|---|
| 5,518,828 A | 5/1996 | Senetar |
| 5,541,014 A * | 7/1996 | Micheli et al. ............... 429/19 |
| 5,554,453 A | 9/1996 | Steinfeld et al. |
| 5,605,770 A | 2/1997 | Andreoli et al. |
| 5,637,415 A | 6/1997 | Meltser |
| 5,702,838 A | 12/1997 | Yasumoto et al. |
| 5,763,113 A | 6/1998 | Meltser et al. |
| 5,789,091 A | 8/1998 | Wozniczka et al. |
| 6,033,793 A * | 3/2000 | Woods et al. ................. 429/17 |
| 6,083,636 A * | 7/2000 | Hsu ............................ 429/13 |

* cited by examiner

METHANOL TAILGAS COMBUSTOR CONTROL METHOD

CROSS REFERENCE TO RELATED APPLICATIONS

This application discloses subject matter which is disclosed and claimed in co-pending U.S. patent application, Ser. No. 09/345,127, Attorney Docket No. H-204300, filed Jul. 6, 1999, now abandoned, in the names of Bruce J. Clingerman, Kenneth D. Mowery, and Eugene V. Ripley, entitled "Combustor Air Flow Control Method for Fuel Cell Apparatus," and the continuation thereof filed May 5, 2000 as Ser. No. 09/565,781, issued as U.S. Pat. No. 6,306,531, the entire contents of which are incorporated by reference.

This application is a continuation-in-part of U.S. Ser. No. 09/358,080, filed Jul. 21, 1999, now abandoned, in the names of David J. Hart-Predmore and William H. Pettit, and entitled "Methanol Tailgas Combustor Control Method."

STATEMENT OF GOVERNMENT SUPPORT

The Government of the United States of America has right in this invention pursuant to Agreement No. DE-AC02-90CH10435 awarded by the U.S. Department of Energy.

FIELD OF THE INVENTION

The present invention relates, in general, to electrochemical fuel cells and, more specifically, to combustors for heating a fuel processor.

BACKGROUND OF THE INVENTION

Fuel cells have been used as a power source in many applications. Fuel cells have also been proposed for use as a vehicular power plant to replace the internal combustion engine. In proton exchange membrane (PEM) type fuel cells, hydrogen is supplied to the anode side of the fuel cell and air or oxygen is supplied as the oxidant to the cathode side. PEM fuel cells include a "membrane electrode assembly" (a.k.a. MEA) comprising a thin, proton transmissive, solid polymer membrane-electrolyte having the anode on one of its faces and the cathode on the opposite face. The MEA is sandwiched between a pair of electrically conductive elements which (1) serve as current collectors for the anode and cathode, and (2) contain appropriate channels and/or openings therein for distribution the fuel cell's gaseous reactants over the surfaces of the respective anode and cathode catalysts. A plurality of individual cells are commonly bundled together to form a PEM fuel cell stack.

For vehicular applications, it is desirable to use a liquid fuel such as an alcohol (e.g., methanol or ethanol), or hydrocarbons (e.g., gasoline) as the fuel for the vehicle owing to the ease of on-board storage of liquid fuels and the existence of a nationwide infrastructure for supplying liquid fuels. However, such fuels must be dissociated to release the hydrogen content thereof for fueling the fuel cell. The dissociation reaction is accomplished heterogeneously within a chemical fuel processor, known as a fuel processor, that provides thermal energy throughout a catalyst mass and yields a reformate gas comprising primarily hydrogen and carbon dioxide. For example, in the steam and methanol reformation process, methanol and water (as steam) are ideally reacted to generate hydrogen and carbon dioxide according to this reaction:

$$CH_3OH + H_2O \rightarrow CO_2 + 3H_2.$$

The reforming reaction is an endothermic reaction that requires external heat for the reaction to occur. The heat required to produce enough hydrogen varies with the demand put on the fuel cell system at any given point in time. Accordingly, the heating means for the fuel processor must be capable of operating over a wide range of heat outputs. Heating the fuel processor with heat generated externally from either a flame combustor or a catalytic combustor is known. U.S. patent applications Ser. No. 08/975,422 now U.S. Pat. No. 6,232,005 and Ser. No. 08/980,087 now U.S. Pat. No. 6,077,620 filed in the name of William Pettit in November, 1997, and assigned to the assignee of the present invention, disclose an improved catalytic combustor, and the integration thereof with a fuel cell system which fuels the combustor with unreformed liquid fuel, hydrogen-containing anode exhaust gas from the fuel cell, or both. The operating cycle depends on many factors, such as anode stoichiometry, steam/carbon ratio, electrical demand placed on the system, etc.

Thus, it would be desirable to provide a method for controlling a combustor in a fuel cell system which makes efficient use of all available fuel. It would also be desirable to provide a method for controlling a combustor having dual fuel and multiple fuel composition inlet streams. It would also be desirable to provide a method for controlling a combustor having dual fuel and multiple fuel composition inlet streams and dual oxidant (air) inlet streams with differing oxygen content. It would also be desirable to provide a method for controlling a combustor having dual fuel and multiple fuel composition inlet streams which meets current vehicle emission requirements at all times during the fuel cell operation cycle.

SUMMARY OF THE INVENTION

A control method for a methanol tailgas combustor used in a fuel cell system in which some unused hydrogen from the anode (anode effluent), and unused oxygen from the cathode (cathode effluent) of a fuel cell stack are supplied as separate fuel and air streams to the combustor with selective quantities of fuel processor reformate and separate fuel and air supplies. The terms effluent and exhaust are used herein interchangeably.

In one aspect of the present invention, the control method comprises the steps of:

providing first and second fuel streams to the combustor, the first fuel stream being a hydrocarbon fuel stream, the second fuel stream consisting of reformate from the fuel processor and/or the anode effluent from the fuel cell;

providing first and second air flow streams to the combustor, the first air flow stream being from first air source, the second air flow stream being the cathode effluent from the fuel cell;

determining the power input requirement of the fuel processor;

determining the output power of the combustor to support the determined power input requirement of the fuel processor; and regulating the quantity of at least one of each of the first and second fuel streams and at least one of each of the first and second air flow streams to the combustor to provide a power output from the combustor to meet the determined power output requirement of the fuel processor.

In one aspect of the present method, the regulating step comprises the utilization of all available second fuel stream and second air flow stream in the combustor prior to supplying any of the first fuel stream and/or the first air flow stream to the combustor.

In one aspect of the present method for the initial start-up of the combustor, the method comprises the step of before supplying the first fuel stream to the combustor, preheating a catalyst bed in the combustor to a predetermined operating temperature. In the start-up mode, the first fuel stream and the first air flow stream are exclusively supplied to the combustor unless an optional buffer or supply of reformate or hydrogen is available.

In a fuel processor start-up mode of operation, the present method includes the steps of:

before supplying a hydrocarbon fuel to the fuel processor, calculating the power requirements of the combustor to raise the temperature of the fuel processor to a predetermined warm-up temperature;

determining the heat content of the first fuel stream and the first air stream to the combustor to provide the determined power requirements of the combustor to raise the fuel processor to the predetermined warm-up temperature;

measuring the temperature of the fuel processor; and regulating the quantity of the first air stream supply to the combustor to balance the enthalpy of the first fuel stream and the first air stream supplied to the combustor to supply heat energy at the desired temperature.

Preferably, the regulating step includes the step of regulating the quantity of the first air stream supply to the combustor by controlling the output flow of one or more valves in the first air stream supply or by varying the speed of the air compression device supplying the first air flow stream. The output flow of a valve is preferably adjusted by controlling the diameter of an output flow orifice of the valve. Alternatively, the output flow of a valve is adjusted by changing the position of the valve in the valve body from open to closed or to an intermediate position such as partially open or partially closed. It is most preferred to control the diameter of the output flow orifice of the valve.

After the fuel processor has reached a predetermined warm-up temperature sufficient to produce reformate from fuel and water, the present method comprises the steps of:

diverting all of the reformate from the fuel processor to the combustor;

determining the enthalpy of the reformate generated by the fuel processor;

determining the enthalpy of the combustor output attributed to combustion of the reformate in the combustor;

calculating the power requirements of the combustor to raise the temperature of the fuel processor to a predetermined start-up temperature;

calculating the difference between the enthalpy of the reformate diverted to the combustor and the predetermined power output requirements of the combustor;

determining the first air flow stream and the first fuel stream quantities to the combustor based on the calculated difference;

supplying the first fuel stream to the combustor in the determined quantity; and regulating the first air stream quantity to the combustor to zero the difference.

In this latter aspect of the present method, the first fuel flow is regulated to the combustor based on the total output power requirement of the combustor and the enthalpy of the reformate supplied to the combustor from the fuel processor.

In another aspect of the present method, the method includes the steps of after the fuel processor temperature has reached the predetermined start-up temperature, diverting all of the fuel processor reformate to the fuel cell;

calculating the power requirement and operating temperature of the fuel processor during a run mode of operation;

communicating the output gas stream of the fuel processor to the fuel cell;

determining the enthalpy of the anode effluent and the cathode effluent from the fuel cell;

communicating the anode effluent and the cathode effluent to the combustor;

calculating the power requirements of the combustor to operate the fuel processor at the predetermined run temperature and power output;

calculating the difference between the enthalpy of the anode effluent and cathode effluent supplied to the combustor and the calculated power output requirement of the combustor;

calculating the first fuel stream and the first air flow stream requirements for the combustor based on the determined difference;

supplying the first fuel stream and the first air flow stream in the calculated quantities to the combustor; and adjusting the quantity of the first air flow stream to the combustor to run the combustor at the preset operating temperature. However, the first air flow stream may not be required under normal operating conditions depending on cathode stoichiometry.

In this latter aspect of the invention, the control method adjusts both of the quantity of the first fuel stream and the first air flow streams applied to the combustor based on the determined difference.

In order to shut down the combustor operation, the control method determines if the supply of the first fuel stream to the fuel processor is discontinued and, if the first fuel stream is discontinued, sets the flow rate of the first air flow stream to the combustor to a preset flow rate to lower the combustor temperature to a preset shutdown temperature.

Alternately, if the first fuel stream flow is not discontinued, the method calculates the enthalpy of the anode effluent and the cathode effluent from the fuel cell, and adjusts the flow rate of the first air flow stream to the combustor to consume all of the anode effluent.

Finally, the present method, in another aspect in which the method executes a diagnostic loop, the method includes the steps of:

comparing at least one of a combustor catalyst bed temperature, a combustor vaporizer temperature, an inlet air stream temperature to the combustor, the anode effluent inlet temperature, a predetermined temperature rate of change of any of said temperatures, a vaporizer air flow rate, the pressure of the combustor, and the combustor air flow rate with respective limits;

determining if any of the measured parameters exceeds the respective preset limit; and discontinuing operation of the combustor if any of the preset limits are exceeded.

In one aspect of the present control method where the fuel cell is deactivated, all of the fuel processor output stream is diverted to the combustor. Fuel from the first fuel stream, if necessary, and air from the first air flow stream, if necessary, are supplied to the combustor in quantities determined by the enthalpy determination to raise the temperature of the fuel processor to a desired operating temperature.

The present control method, in another aspect during continuous run operation of the fuel cell, by using enthalpy balance, completely utilizes all excess hydrogen and oxygen in the anode and cathode effluents from the fuel cell before any additional amounts of external fuel or compressor air are supplied to the combustor.

In another aspect, the present control method contemplates the regulation of the amount of air supplied to the combustor from an external source or an air compressor based on the determined power requirements of the combustor as demanded by the fuel processor and the amount of oxygen in the cathode effluent supplied to the combustor. The amount of the first air stream supplied from the compressor to the combustor is regulated to balance the enthalpy of the reactions in the combustor to support a given combustor heat output to the fuel processor.

The methanol tailgas combustor control method of the present invention regulates air flow from an external source to the combustor for enthalpy balance to provide temperature control within the combustor and a desired power or heat output at any operating level of the fuel processor. The present control method provides control of a combustor in a fuel cell apparatus to meet current and future governmental emission levels.

BRIEF DESCRIPTION OF THE DRAWINGS

The various features, advantages and other uses of the present invention will become more apparent by referring to the following description and drawings in which.

DESCRIPTION OF THE PREFERRED EMBODIMENTS

The invention is hereafter described in the context of a fuel cell fueled by a methanol (MeOH) fuel processor. However, it is to be understood that the principles embodied herein are equally applicable to fuel cells fueled by other fuels, such as ethanol or gasoline, which utilize a fuel processor for conversion into a hydrogen rich stream.

Figure 1:
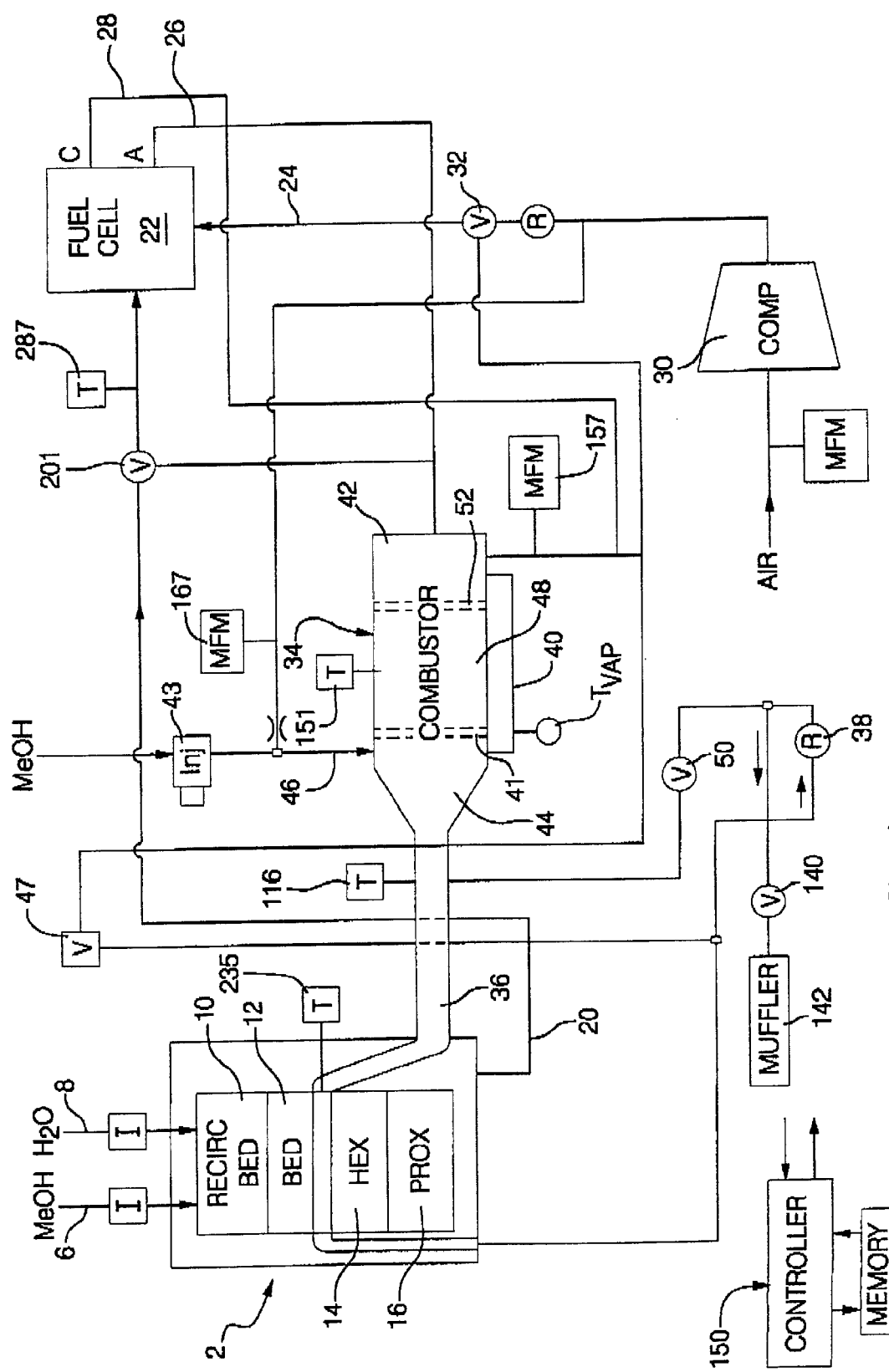
FIG. 1 is a schematic diagram of a fuel cell apparatus according to the present invention.

As shown in FIG. 1, a fuel cell apparatus includes a fuel processor 2 for catalytically reacting methanol from a methanol stream 6 and water or steam from a water stream 8 in a recirculating bed 10 and a catalytic bed 12 to form a hydrogen-rich reformate gas stream. A heat exchanger 14 is interposed between the catalytic bed 12 and a preferential oxidation (PROX) reactor 16. The reformate output gas stream comprises primarily $H_2$ and $CO_2$, but also includes $N_2$, CO and water. The reformate stream passes through the preferential oxidation (PrOx) reactor 16 to reduce the CO-levels therein to acceptable levels (i.e., below 20 ppm). The $H_2$ rich reformate 20 is then fed into the anode chamber of a fuel cell 22. At the same time, oxygen (e.g., air) from an oxidant stream 24 is fed into the cathode chamber of the fuel cell 22. The hydrogen from the reformate stream 20 and the oxygen from the oxidant stream 24 react in the fuel cell 22 to produce electricity.

Exhaust or effluent 26 from the anode side of the fuel cell 22 contains some unreacted hydrogen. The exhaust or effluent 28 from the cathode side of the fuel cell 22 contains some unreacted oxygen. Air for the oxidant stream 24 is provided by a compressor 30 and is directed to the fuel cell 22 by a valve 32 under normal operating conditions. During start-up, however, the valve 32 is actuated to provide air to the input of a combustor 34 used to heat the fuel processor 2, as will be described in more detail hereinafter.

Heat from the heat exchanger 14 heats the catalyst bed(s) 10 and 12 in the fuel processor 2 and also heats the PROX 16. In this regard, the $H_2O$-MeOH mixture supplied to the fuel processor 2 will be vaporized and preferably be recirculated/refluxed several times (e.g., 20×) through the recirculating bed 10 in the fuel processor 2, the heat exchanger side of the bed 12, the PROX 16 and the heat exchanger 14 such that the mixture also functions as a heat transfer medium for carrying heat from the heat exchanger 14 into the beds 10 and 12 of the fuel processor 2 and to the PROX 16.

The heat exchanger 14 itself is heated from exhaust gases 36 exiting the catalytic combustor 34. The gases 36 exiting the heat exchanger 14 are still hot and could be passed through an expander, not shown, which could drive the compressor 30 or utilized in another manner. In the present implementation, as shown in FIG. 1, the exhaust gases from the combustor 34 used to heat the fuel processor 2 pass through a regulator 38, a shutoff valve 140 and a muffler 142 before being dumped to atmosphere.

MeOH vapor 40 emanates from a vaporizer 41 nested in the exhaust end 44 of the combustor 34. The vaporizer 41 is a heat exchanger that extracts heat from the combustor 34 exhaust to vaporize a first fuel stream, such as liquid MeOH 46 provided to the vaporizer 41 by fuel metering device 43 from the vehicle's fuel tank. The MeOH vapor 40 exiting the vaporizer 41 and the anode effluent 26 are reacted in a catalyst section 48 of the combustor 34 lying intermediate the inlet and exhaust ends 42 and 44 respectively of the combustor 34. Oxygen is provided to the combustor 34 either from the compressor 30 (i.e., via valve 32) or from a second air flow stream, such as a cathode effluent stream 28 depending on system operating conditions. A valve 50 permits dumping of the combustor exhaust 36 to atmosphere when it is not needed in the fuel processor 2.

Further details concerning the construction of the combustor 34 can be had by referring to pending U.S. patent applications Ser. No. 08/975,422 now U.S. Pat. No. 6,232,005 and Ser. No. 08/980,087 now U.S. Pat. No. 6,077,620 filed in the name of William Pettit in November 1997, the entire contents of which are incorporated herein by reference.

An electric heating element (EHC) 52 is provided upstream of the catalyst bed 48 in the combustor 34 and serves to vaporize the liquid fuel 46 entering the combustor 34, heat the gas entering the bed 48 as well as preheating the bed 48 during start-up of the combustor 34. The heating element 52 may or may not be catalyzed. After start-up, as described hereafter, the electric heater 52 is no longer required since the fuel will be vaporized by the exhaust gases emanating from the exhaust end 44 of the combustor 34. A preferred electric heater 52 comprises a commercially available, uncatalyzed extruded metal monolith resistance element such as is used to light off the catalyst of a catalytic converter used to treat IC engine exhaust gases.

The exhaust end 44 of the combustor 34 includes a chamber that houses the vaporizer 41 which is a coil of metal tubing which is used to vaporize liquid fuel to fuel the combustor 34. More specifically, under normal post-start-up conditions, air or cathode effluent 28 may be introduced into the inlet end of the coil and mixed with liquid fuel sprayed into the inlet end via a conventional automotive type fuel injector. The airborne atomized fuel passes through the several turns of the heated coil tube, and therein vaporizes and exits the tube at an outlet which is located in the cathode effluent supply conduit. This vaporized first fuel stream supplements a second fuel stream or anode effluent 26 as fuel for the combustor 34 as may be needed to meet the transient and steady state needs of the fuel cell apparatus. The vaporizer coil is sized to vaporize the maximum flow rate of fuel with the minimum combustor exhaust flow rate, and is designed to operate at temperatures exceeding the autoignition temperature of the MeOH-air mixture therein throughout its fuel operational range. Autoignition within the vaporizer is avoided, however, by insuring that the velocity of the mix flowing through the coil significantly exceeds the worst-case flame speed of the mixture which varies with the composition of the inlet streams.

As shown in FIG. 1, and as described in greater detail hereafter, the amount of heat demanded by the fuel processor 2 which is to be supplied by the combustor 34 is dependent upon the amount of fuel and water input to the fuel processor 2. The greater the supply of fuel and water, the more heat energy the reformer will need. To supply the heat demand of the fuel processor 2, the combustor 34 utilizes all anode exhaust or effluent and potentially some liquid fuel. Enthalpy equations are used to determine the amount of cathode exhaust or air to be supplied to the combustor 34 to meet the desired temperature requirements of the combustor 34, and the combustor 34 ultimately satisfies the heat demanded by the fuel processor 2. The oxygen, air, or air like stream provided to the combustor 34 includes one or both of cathode effluent exhaust 28 which is typically a percentage of the total oxygen supplied to the cathode of the fuel cell 22 and a compressor output air stream depending on whether the apparatus is operating in a start-up mode wherein the compressor air stream is exclusively employed or in a run mode using the cathode effluent 28 and/or compressor air. In the run mode, any total air, oxygen or diluent demand required by the combustor 34 which is not met by the cathode effluent 28 is supplied by the compressor 30 in an amount to balance the enthalpy equations, and to satisfy the temperature and heat demanded by the combustor 34 and the fuel processor 2, respectively.

The air quality control is implemented via an air dilution valve 47 which is a stepper motor driven valve having a variable orifice to control the amount of bleed-off of cathode exhaust supplied to the combustor 34 and potentially the system exhaust, which bled-off air is dumped to atmosphere through the regulator 38, the valve 140, and the muffler 142. A further description of the air dilution valve 47 will be presented hereafter in conjunction with the various modes or sequences of operation of the combustor 34.

The fuel cell apparatus of the present invention operates as follows. At the beginning of operations when the fuel cell apparatus is cold and starting up: (1) the compressor 30 is driven by an electric motor energized from an external source (e.g., a battery) to provide the necessary system air; (2) air is introduced into the combustor 34 as well as the input end of the vaporizer 41; (3) liquid fuel 46 (e.g., MeOH) is injected into the inlet end of the vaporizer 41 via a fuel injector, and atomized as fine droplets with the air flowing therein; (4) the air-MeOH droplet mix exits the vaporizer 41 and mixes with compressor air introduced into the combustor 34, and is then introduced into the input end 42 of the combustor 34; (5) the mix passes through a flame arrestor in the front of the combustor 34; (6) the mix is then heated by the heater 52 to vaporize the liquid droplets and heat the mixture; (7) the preheated vaporous mix then enters a mixing-media bed for still further intimate mixing before contacting the light-off catalyst bed; (8) upon exiting the mixing-media bed, the mix begins oxidizing on the light-off catalyst bed just before it enters a primary catalyst bed 48, or reacting section of the combustor 34, where substantially complete combustion of the fuel is effected; and (9) the hot exhaust gases exiting the catalyst bed are conveyed to the heat exchanger 14 associated with the fuel processor 2.

Once the fuel processor's temperature has risen sufficiently to effect and maintain the reformation process: (1) valve 32 is activated to direct air to the cathode side of the fuel cell 22; (2) MeOH and water are fed to the fuel processor 2 to commence the reformation reaction; (3) reformate exiting the fuel processor 2 is fed to the anode side of the fuel cell 22; (4) anode effluent 26 from the fuel cell 22 is directed into the combustor 34; (5) cathode effluent 28 from the fuel cell 22 is directed into the combustor 34; (6) air is introduced into the vaporizer 41; (7) liquid methanol is sprayed into the vaporizer 41; (8) the methanol-air mix circulates through the heated vaporizer coil where the MeOH vaporizes; (9) the methanol-air mix along with the cathode effluent 28 then mixes with the anode effluent 26; and (10) the mix is burned on the catalyst bed of the combustor 34.

During normal (i.e., post start-up) operating conditions, the heater 42 is not used as the vaporizer 41 alone vaporizes the MeOH and preheats the MeOH-air mix. Under certain conditions, as described hereafter, the combustor 34 could operate solely on the anode and cathode effluents, without the need for additional MeOH fuel from the vaporizer 41. Under such conditions, MeOH injection to the combustor 34 is discontinued. Under other conditions, e.g., increasing power demands, supplemental fuel is provided to the combustor 34.

As described above, the combustor 34 receives multiple fuels, such as a methanol-air mix as well as anode effluent 26 from the anode of the fuel cell 22. Oxygen depleted exhaust air 28 from the cathode of the fuel cell 22 and air from the compressor 30 are also supplied to the combustor 34.

According to the present invention, a controller 150 shown in FIG. 1 controls the operation of the combustor 34. Anode exhaust or effluent plus a liquid fuel, i.e., methanol, if required, support the energy requirements of the combustor 34. An enthalpy balance maintains the desired reaction temperature by controlling the amount of air and/or cathode exhaust supplied to the combustor 34 to meet all fuel processor heat requirements.

It should be noted that the energy requirements of the apparatus components are expressed herein in terms of power. This is for convenience and is meant to express an energy rate, often in units of kilowatts, rather than BTU per second.

The controller 150 may comprise any suitable microprocessor, microcontroller, personal computer, etc., which has central processing unit capable of executing a control program and data stored in a memory. The controller 150 may be a dedicated controller specific to the combustor 34 or implemented in software stored in the main vehicle electronic control module. Further, although the following description describes a software based control program for controlling the combustor 34 in various modes of operation or sequence, it will also be understood that the combustor control can also be implemented in part or whole by dedicated electronic circuitry.

According to the present invention, the controller 150 controls the operation of the combustor 34 in six different modes or sequences of operation. The separate modes of operation include (1) combustor start-up, (2) combustor operation during fuel processor warm-up, (3) combustor operation during fuel processor start-up, with the fuel cell off-line, (4) combustor operation during fuel processor run mode with the fuel cell stack on-line, (5) combustor shut down, and (6) combustor diagnostics. Each of these control sequences will be described with reference to FIGS. 2–7 and to the equations in Table 1.

The various sensors, actuators, and devices which supply input signals to the controller 150 or are controlled by output signals from the controller 150 will be described in conjunction with the appropriate sequence step described hereafter.

Combustor Start-Up

Figure 2:
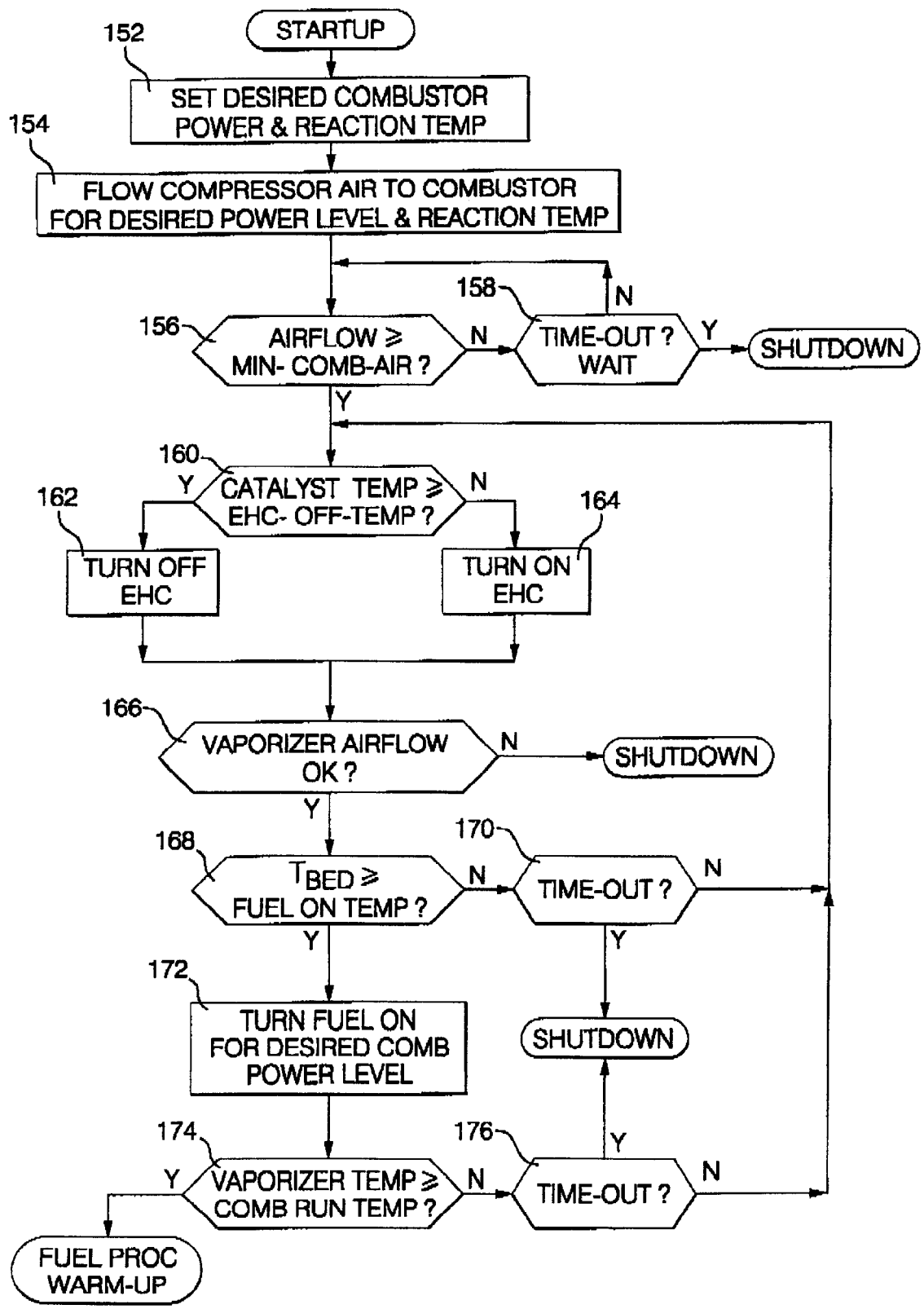
FIG. 2 is a flow diagram depicting the combustor start-up control sequence according to the present invention.

Turning now to FIG. 2, there is depicted the sequence of program steps performed by the controller 150 to control the combustor 34 during a start-up mode or sequence.

Initially, the controller 150 in step 152 selects the start-up combustor power level and reaction temperature. These values are based on a particular combustor performance and overall system requirements for warm-up times since, at this point in the operation of the engine, the fuel processor 2 and the fuel cell 22 are inactive and there is no hydrogen available at start-up of the combustor 34 from the fuel cell 22 or from the fuel processor 2. Other methods include a quick start fuel processor and stack or on-board hydrogen or reformate storage.

The controller 150 switches the air bypass valve 32 to a position diverting all air output flow from the compressor 30 to the combustor 34. The controller 150 regulates the compressor 30 to provide the desired air flow to the combustor 34 for the selected power level and reaction temperature in step 154. The controller 150 also controls the orifice size of the stepper motor driven air dilution valve 47 to provide selected bleed-off of the air supplied to the combustor 34 in order to balance the enthalpy of the reaction in the combustor 34 by determining the amount of air flow required in the combustor 34 to create a desired reaction temperature within the combustor given the heat requirements demanded by the fuel processor 2.

Since no hydrogen is available at combustor start-up, all power for combustor operation must come from another fuel, such as methanol. The controller 150 uses equations 1, 2, and 16 in Table 1 to determine the desired methanol flow and air flow required to obtain the combustor reaction temperature calculated using equations 4–15 in Table 1.

The controller 150 in step 156 then compares the air flow to the compressor 30 as measured by a mass flow meter 157 with a minimum combustor air flow. If the measured air flow is less than the preset minimum combustor air flow, the controller 150 enters a timeout loop in step 158 which sets a time limit for the combustor 34 to reach the desired air flow level. If time expires in the timeout loop in step 156, the controller 150 switches to a combustor shutdown sequence described hereafter.

When the measured air flow exceeds the preset minimum combustor air flow, the controller 150 in step 160 checks a sensor or thermocouple 151 to determine the temperature of the catalyst bed 48 in the combustor 34. If the temperature of the bed 48 exceeds the heater 52 preset turnoff temperature, the controller 150 turns off the heater 52 in step 162. If the temperature of the bed in step 160 is less than the heater turnoff temperature, the controller 150 turns on the heater in step 164.

Next, in step 166, the controller 150 determines the vaporizer air flow from the output of a mass flow meter 167 and compares the measured air flow with a minimum air flow set point. If the measured vaporizer air flow is less than the set point, the combustor shutdown sequence is executed. However, if the vaporizer air flow is above the minimum air flow set point, the controller 150 next determines if the temperature of the catalyst bed 48 in the combustor 34, as measured by sensor 151, exceeds a minimum temperature set point. If the temperature of the bed is less than the minimum temperature set point, a timeout loop in step 170 is executed which routes control back through steps 160–168 as long as time remains in the timeout period. Eventually, if the timeout period in the timeout loop in step 170 is exceeded and the temperature of the combustor bed has not reached the set point temperature, the controller 150 executes the combustor shutdown sequence.

When the measured temperature of the combustor bed 48 equals or exceeds the minimum set point temperature, the controller 150 turns the methanol fuel flow on via fuel injector 43 at a desired combustion power level as set in step 172.

The controller 150 then measures the vaporizer 41 temperature in step 174 from sensor Tvap and compares the measured vaporizer temperature with a set point temperature for running the combustor 34 at full power. If the vaporizer temperature is less than the set point run temperature, a timeout loop 176 is entered to allow time for the vaporizer temperature to come up to set point. Eventually, if the timeout period is exceeded without a temperature match, the combustor shutdown sequence is executed.

Fuel Processor Warm-Up

Figure 3:
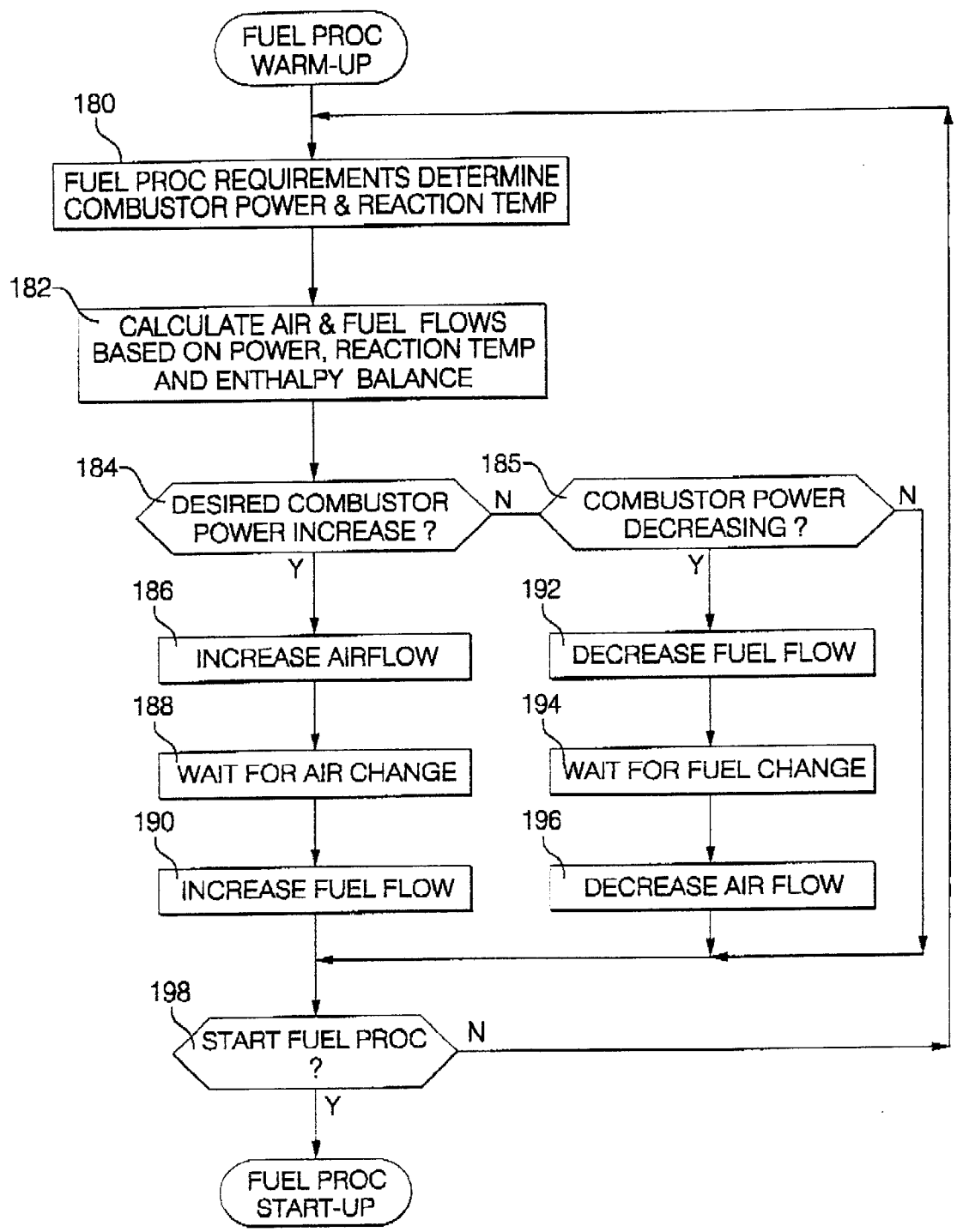
FIG. 3 is a flow diagram depicting the fuel processor warm-up combustor control sequence according to the present invention.

When the temperature of the vaporizer 41 equals or exceeds the minimum set point run temperature in step 174, the combustor start-up sequence is completed and the controller then executes the fuel processor warm-up sequence shown in FIG. 3. In step 180, the controller 150 sets the combustor power level and reaction temperature based on the system requirements for warming up the fuel processor 2 to a preset temperature. If stored hydrogen is not available, all of the combustor power comes from the liquid fuel. The controller 150 uses equations, 1, 2, and 16 to calculate the methanol flow. The air flow required to obtain the desired combustor reaction temperature is calculated by the controller 150 in step 182 using equations 4–15 and controlled by the air dilution valve 47 and/or compressor speed.

The controller 150 using feedback from the fuel processor 2 then determines in step 184 if the output power of the combustor 34 is to be increased. If not so desired, then in step 185 it is determined whether combustor power is decreasing. If not, the fuel processor is started at step 198. If combustor power is decreasing, then proceed to step 192.

If in step 184 it is desired that combustor power be increasing, then at step 186 the controller 150 increases the air flow to the combustor 34 in step 186 and then waits in step 188 for the air flow to increase as measured by a change in the combustor exhaust temperature from a sensor or thermocouple 116. This wait period can be a programmed time delay, or a period based on feedback from either an air flow meter, a temperature decrease in the combustor catalyst bed, or a pressure increase in the combustor manifold. Once the wait period has been exceeded, the controller 150 then increases the methanol flow to the combustor 34 in step 190.

In the event that the controller 150 determines that the combustor power is decreasing in step 184, the controller 150 decreases the methanol flow to the combustor 34 in step 192. Another wait period 194 is executed for the fuel flow to decrease to the set amount. This wait period can be a programmed time delay, or based on feedback from either a methanol flow meter, a temperature decrease in the combustor catalyst bed, or a pressure decrease in the combustor manifold. Once the desired fuel flow decrease has occurred, the controller 150 in step 196 decreases the air flow to the combustor 34 for proper reaction power and temperature.

At the end of either step 185, 190 or 196, the controller 150 determines in step 198 if the fuel processor 2 is ready for start-up. If not, steps 180 through 196 are re-executed as described above until the fuel processor 2 is ready for start-up.

As can be seen from the above steps, a change is air flow leads a change in fuel flow when power is increasing and a change in fuel flow leads a change in air flow when power is decreasing.

Fuel Processor Start-Up—Fuel Cell Offline

Figure 4:
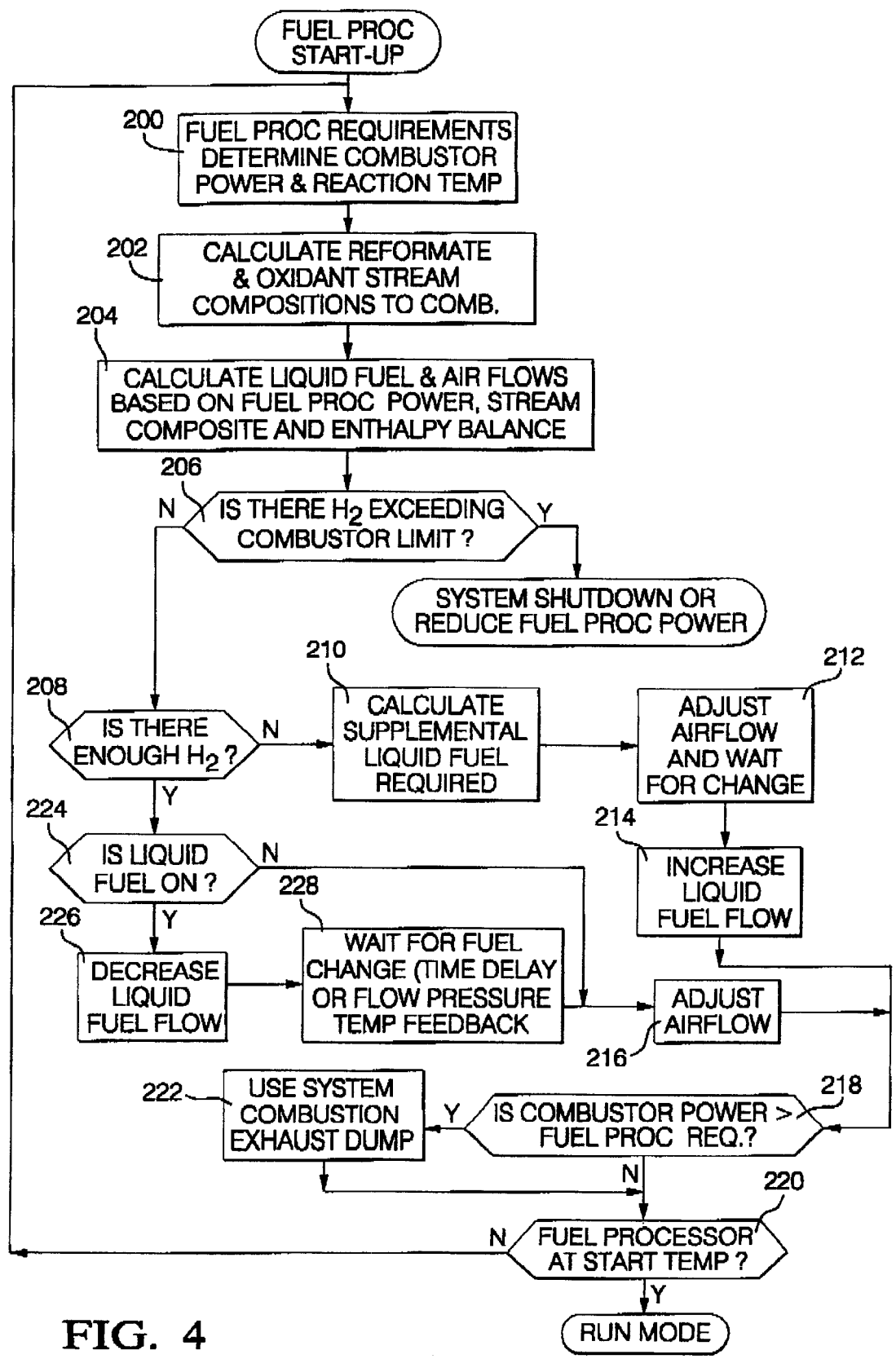
FIG. 4 is a flow diagram depicting the fuel processor start-up combustor control sequence according to the present invention.

At this point, control switches to the fuel processor start-up sequence shown in FIG. 4. In step 200, the fuel processor requirements, such as the operating temperature of the fuel processor catalyst and the desired fuel processor output power (equivalent kilowatts of hydrogen production), are used to determine the combustor power and reaction temperature required to meet the system requirements to start-up the fuel processor 2 to a steady state run temperature. During fuel processor 2 start-up, the fuel processor 2 is operated at an output (hydrogen/effluent production) level that the combustor 34 can consume.

As is conventional, during fuel processor 2 start-up, water and fuel (i.e., methanol) are injected into the fuel processor 2 which produces hydrogen and CO, plus other effluent gases, such as $H_2O$ and $CO_2$. Also, air is injected into the PrOx 16, which consumes some of the gases and, particularly, hydrogen, produced in the fuel processor 2. Thus, a power equivalent of $H_2$ and CO is able to be calculated and it is this output which is circulated to the combustor 34 when the quantity of CO is unacceptable for use by the fuel cell stack 22.

Since, at start-up, the temperature of the fuel processor 2 is not up to a steady state run temperature causing higher than desirable carbon monoxide levels to be present in the reformate, the entire output of the fuel processor 2 is recirculated to the combustor 34 as fuel through a fuel bypass valve 201 which supplies the fuel processor output gas stream to a second inlet on the combustor 34. Bypass air is also supplied to the combustor 34 through air bypass valve 32 to cause combustion of the reformate from the fuel processor 2. Preferably valve 32 is a proportional air bypass valve. The total amount of air from the compressor 30 supplied to the combustor 34 is regulated by one or more of the following: variable compressor speed; the position of the proportional air bypass valve 32; and the diameter of the air dilution valve 47; or the position of valve 47. Thus, output flow of valve 47 is preferably adjusted by controlling the diameter of an output flow orifice of valve 47. The air supplied to the combustor is also controllable by changing the position of valve 32 in the valve body from open to closed or to an intermediate position such as partially open or partially closed. In that regard, equations 1–16 are useful.

The amount of hydrogen in the reformate stream which is supplied to the combustor 34 is calculated by the controller 150 in step 202 based on a given amount of fuel and water injected into the fuel processor 2 which react to make a given amount of hydrogen, carbon monoxide, carbon dioxide and water. The controller 150 also takes into account the injection of a certain amount of air into the PrOx reactor 16 and, based on the amount of air input to the PrOx reactor 16, a determination is made of how much hydrogen generated by the fuel processor 2 is consumed by the PrOx 16. From these calculations, the controller 150 determines the equivalent power (i.e., hydrogen) output from the fuel processor 2.

The controller 150 then compares the calculated or determined hydrogen quantity generated by the fuel processor 2 and supplied to the combustor 34 with the calculated fuel processor start-up power and reaction temperature requirements, taking into account heat generated by the PrOx 16, and, in step 204, calculates the supplemental amount of methanol and oxidant stream flow rates to the combustor using equations 1–16 in Table 1, with the diameter of the orifice of the air dilution valve 47 controlled to balance the enthalpy of the combustor reaction. For example, assuming that, on start-up, the fuel processor 2 produces 30 kilowatts equivalent of hydrogen which is supplied to the combustor 34. However, if the fuel processor 2 is demanding 35 kilowatts equivalent since it is not up to a steady state temperature, the combustor power requirement is also 35 kilowatts, and the combustor 34 will use 30 kilowatts of equivalent fuel from the fuel processor 2 and will require 5 kilowatts of additional methanol. Equations 1–16 are solved to determine how much air is required to generate a desired gas stream temperature at this amount of power. The control program insures that the maximum power possible is obtained first from the output of the fuel processor 2, including any heat generated by the PrOx 16, before additional quantities of methanol are used.

It should be noted that the fuel processor warm-up and fuel processor start-up control sequences for the combustor 34 can be utilized from an initial cold start of the fuel cell apparatus where the engine has been sitting idle for a long period of time and has reached ambient temperature or employed when the engine has been turned off only for a short period of time such that residual heat remains in the fuel processor and combustor catalyst beds. During a quick restart of the engine, it is possible that the fuel processor 2 could generate acceptable levels of reformate, e.g., low amounts of carbon monoxide, from the start.

Referring again to FIG. 4, in step 206 the controller 150 checks if the hydrogen level supply to the combustor 34 exceeds the fuel processor heat requirement or the combustor maximum design power output. If there is excess hydrogen, the controller 150 switches to the combustor shutdown sequence. Alternatively, the fuel processor power could be reduced. If there is not excess hydrogen in step 206, a determination is made in step 208 if there is a sufficient quantity of hydrogen supplied from the fuel processor 2 to the combustor 34. If there is insufficient hydrogen, the controller 150 in step 210 calculates the supplemental amount of methanol required to obtain the desired fuel processor temperature. Again, maximum power is obtained first from the output of the fuel processor 2 and then from methanol. In making this calculation, the controller executes equations 1–3 and 16 in Table 1. Based on the calculated values in step 210, the controller 150 adjusts the air flow to the combustor 34 by valve 47 and/or compressor speed in step 212, waits for the desired air flow change, and then increases liquid methanol fuel flow in step 214 to the combustor 34. The controller 150 adjusts the fuel flow rate in step 214 using the equations in Table 1 based on the fuel energy content.

Next, in step 218, the controller 150 determines if the combustor power output is greater than the fuel processor power requirement. If the answer is no, the controller 150 checks in step 220 if the system is ready to enter a run mode for fuel cell operation. If not, control switches back to step 200 and steps 200–220 are re-executed.

If the combustor power output is greater than the fuel processor requirement, the controller 150 in step 222 opens the combustion exhaust diverter valve 50 to divert or dump combustor exhaust to atmosphere.

Referring back to step 208, if there is enough hydrogen to support fuel processor operation, the controller in step 224 determines if there is methanol fuel flow to the combustor 34. If the answer is yes, the controller 150 in step 226 decreases the amount of the liquid fuel flow to the combustor 34 to a level required to meet fuel processor combustion power requirements. A wait period is executed in step 228 for a fuel flow change, which can be a programmed time delay, or based on feedback from a fuel flow meter, or a temperature decrease in the combustor catalyst bed, or a pressure decrease in the combustor manifold. Steps 216–222 are then executed as described above.

Combustor Run Mode

Figure 5:
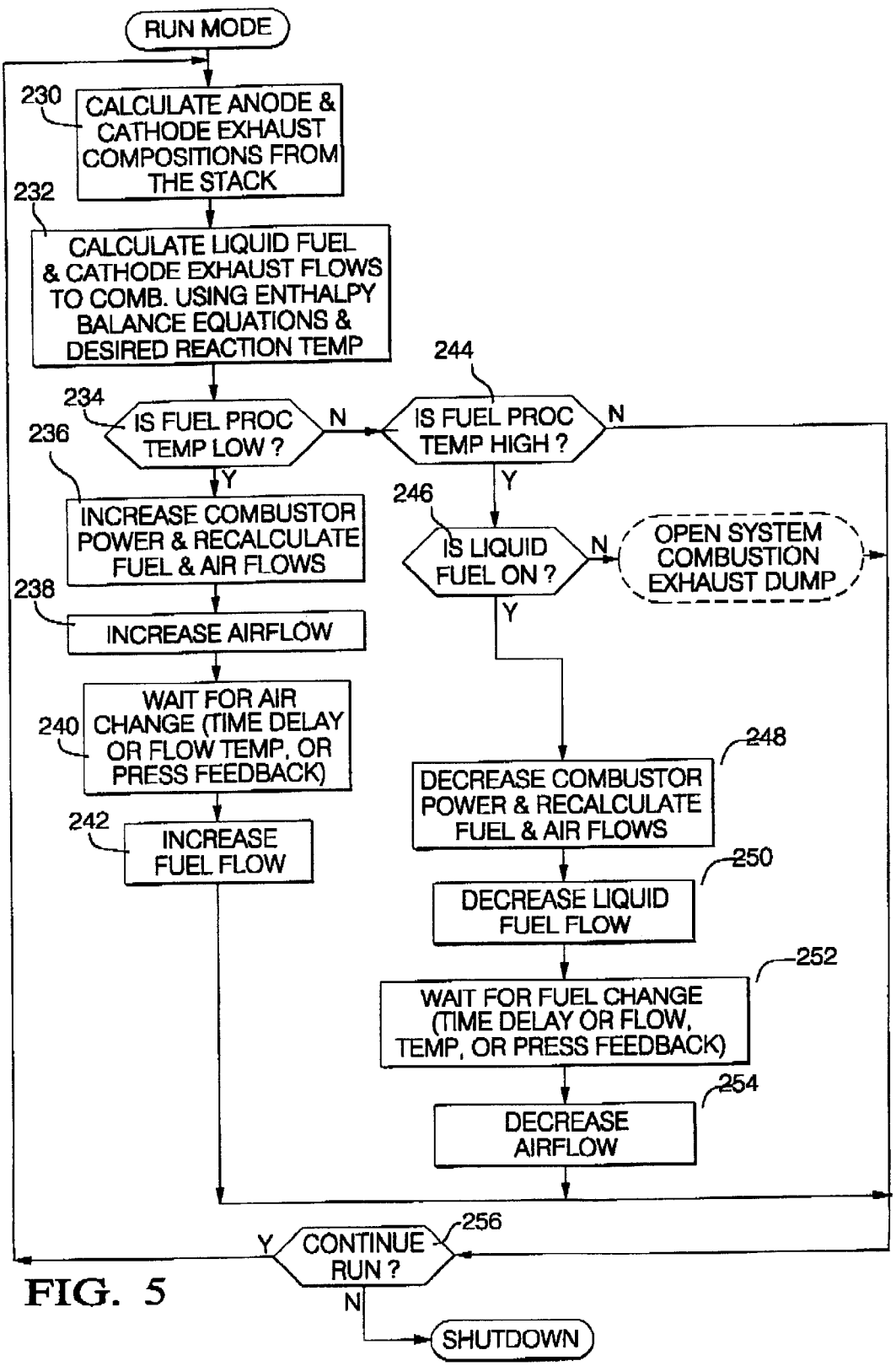
FIG. 5 is a flow diagram depicting the run mode combustor control sequence of the present invention.

FIG. 5 depicts the run mode or sequence of operation of the combustor 34 when the fuel processor 2 is in a run mode. In step 230, the system developed equations are used to calculate the compositions of the anode exhaust streams and the cathode exhaust streams from the fuel cell 22 which are supplied to the combustor 34 as described above. Next, in step 232, the required fuel processor power and reaction temperatures are used to calculate the methanol fuel flow rate and cathode exhaust flow rate to the combustor 34 using the anode exhaust flow rate and composition and the cathode stream composition. Equations 1–16 in Table 1 are used to maintain an enthalpy balance of the reaction by controlling the oxidant stream via regulating the orifice diameter of the air dilution valve 47 and/or the compressor speed.

Next, the fuel processor 2 temperature is checked in step 234, via the output of a temperature sensor thermocouple 235 located between the output of the heat exchanger 14 and the plug flow bed 12 within the fuel processor 2, to determine if it is below a steady state run temperature. If the fuel processor temperature is low, the controller 150 in step 236 increases the combustor 34 output power and recalculates air and fuel flow to the combustor 34 to raise the fuel processor 2 temperature to the steady state set point. In order to increase the combustor power, the controller 150 in step 238 increases the air flow by adjusting the orifice diameter of valve 47 and/or compressor speed and waits in step 240 for the desired change in the air flow to take effect. The wait period can be a programmed time delay, or based on feedback from the air flow meter, a temperature decrease in the combustor catalyst bed, or a pressure increase in the combustor manifold. Next, the controller 150 increases the methanol fuel flow to the combustor 34 in step 242.

Alternately, if the fuel processor steady state temperature is above the steady state run temperature, i.e., not low, in step 234, the controller 150 determines if the fuel processor steady state temperature is high or exceeds the desired steady state temperature in step 244. If the fuel processor temperature as determined in step 244 is higher than the set point, the controller 150 then determines in step 246 if the methanol fuel flow is turned on to the combustor 34. If the liquid fuel flow is not on, the controller 150 activates the exhaust dump valve 50.

If the methanol fuel flow is on as determined in step 246, the controller 150 decreases combustor power in step 248 and recalculates the desired methanol fuel flow and air flow to the combustor 34 using the enthalpy balance equations 1–16 in Table 1. The controller 150 then decreases methanol fuel flow to the combustor 34 in step 250 and waits a predetermined time for a change in the fuel flow in step 252. Again, the wait period can be a programmed time delay, or based on feedback from the fuel flow meter, a temperature decrease in the combustor catalyst bed, or a pressure decrease in the combustor manifold. In step 254, the controller 150 then adjusts the air flow to the combustor 34 for the decreased liquid fuel flow rate.

At the completion of steps 242 or 254, the controller 150 determines if the system is to remain in a continuous run mode and, if so, control switches back to step 230. If system operation is not to be continued, the controller 150 enters a shutdown sequence as described hereafter and shown in FIG. 6.

Shutdown

Figure 6:
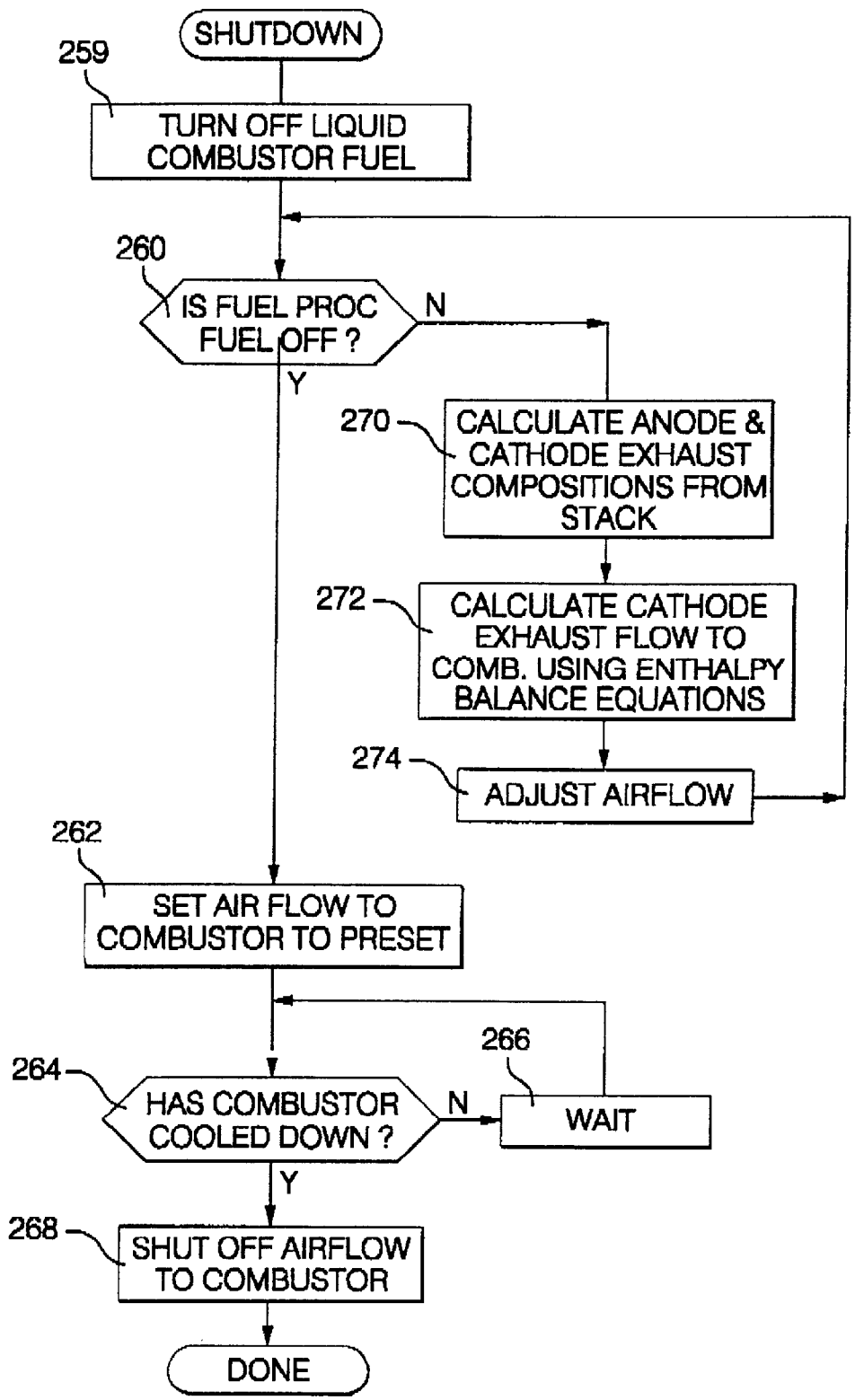
FIG. 6 is a flow diagram of the combustor control shut down sequence according to the present invention.

The control sequence for shutting down the combustor 34 is initiated by a shutdown command or when the controller 150 reaches a shutdown sequence as shown in FIG. 6. The sequence begins at step 259 where the shutdown command initiates the turning off of liquid fuel to the combustor.

In step 260 shown in FIG. 6, the controller 150 determines if the fuel processor fuel supply is turned off. If it is, the controller 150 in step 262 sets the air flow to the combustor 34 to a preset shutdown flow rate. Next, in step 264, the controller 150 determines if the combustor 34 has reached a preset shutdown temperature. If not, the controller 150 executes a wait period 266 and loops through steps 264 and 266 until the combustor temperature has reached its desired shutdown temperature. The controller 150 then shuts off air flow to the combustor 34 in step 268 to complete the combustor shutdown sequence.

Referring back to step 260, if the fuel processor fuel supply has not been turned off, hydrogen and exhaust air are still being supplied to the combustor 34. In this event, the controller 150 in step 270 determines the remaining energy and composition by calculating the anode and cathode exhaust compositions from the fuel cell 22. In step 272, the controller 150 calculates the cathode flow rate and oxidant flow rate from the fuel cell 22 required for the combustor 34 to consume all of the remaining fuel in the apparatus. The controller 150 then adjusts the air flow rate to the combustor 34 in step 274 via air valve 47 as required by the results of step 272 and returns to step 260 until all of the fuel remaining in the apparatus has been consumed. It should be noted that if the energy content remaining in the apparatus is high, the controller 150 may cause the combustor 34 to exhaust the remaining fuel content energy through the system dump valve 50.

Diagnostic Loop

Figure 7:
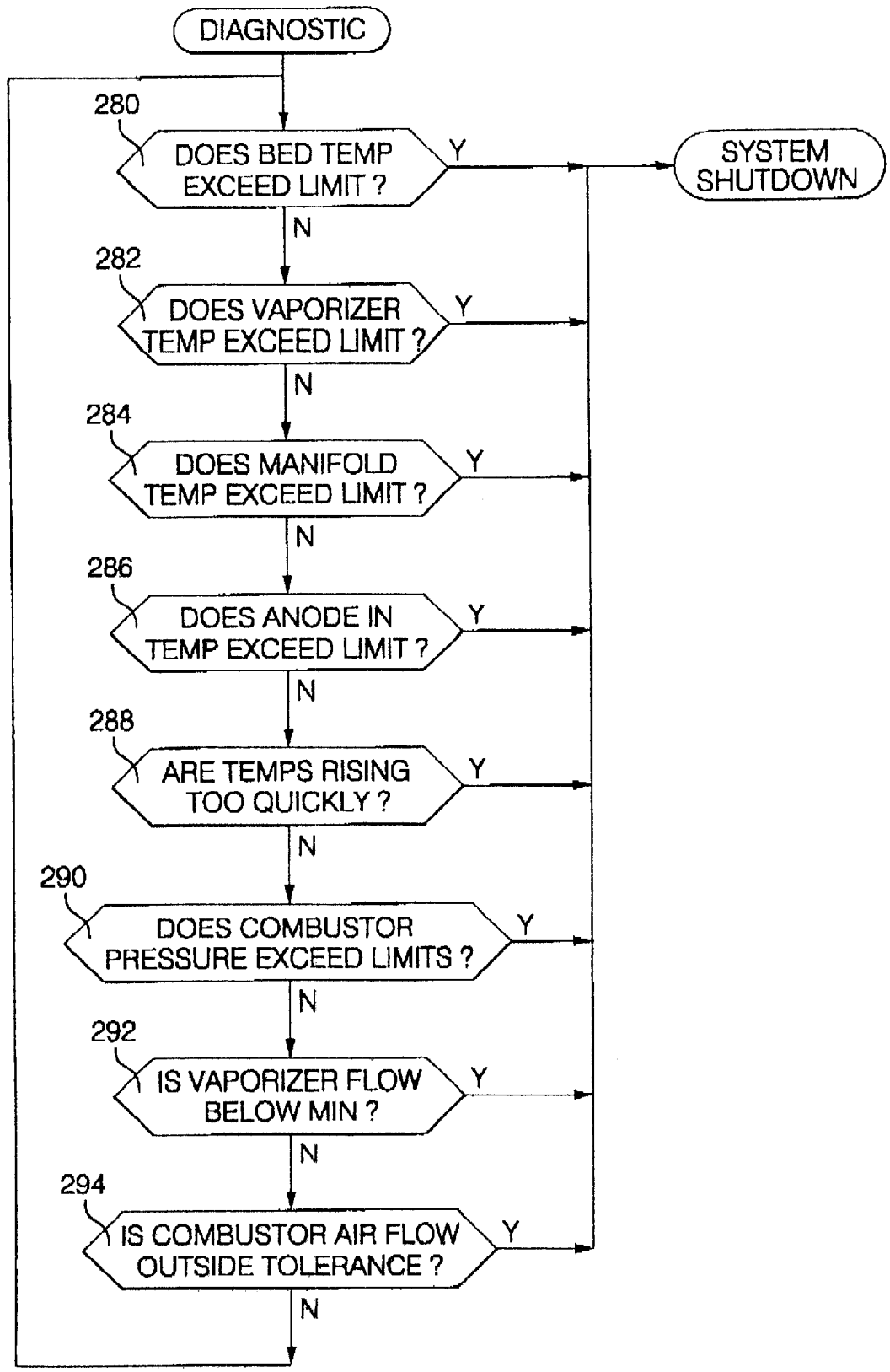
FIG. 7 is a block diagram of the combustor control diagnostic sequence of the present invention.

FIG. 7 depicts a diagnostic loop which is continuously executed by the controller 150 to monitor various temperatures, pressures, and flow rates within the combustor 34 and compare the measured values with preset limits to cause a system shutdown in the event any of the measured quantities exceed a preset maximum or minimum limit.

In step 280, the combustor catalyst bed temperature as measured by sensor 151 is compared with a preset maximum temperature limit. In step 282, the combustor vaporizer temperature as measured by sensor Tvap is compared with a preset maximum temperature. In step 284, the temperature of the manifold in the inlet to the combustor 34 is compared with a preset maximum temperature.

In step 286, the anode inlet temperature sensor 287 is compared with a maximum temperature limit.

The controller in step 288 determines if any monitored temperature within the combustor 34 exceeds a predetermined temperature rise or time dT/dt. Likewise, in step 290, the controller 150 determines if any monitored pressure within the combustor 34 exceeds a predetermined pressure limit.

Another diagnostic performed by the controller as shown in step 292, determines whether the vaporizer air flow rate as measured by sensor 167 is at or above the minimum desired set point before any liquid fuel injection occurs into the combustor 34. Finally, in step 294, the controller 150 determines if the combustor air flow from sensor 157 matches the actual combustor air flow within a preset tolerance range.

In summary, there has been disclosed a unique methanol tailgas combustor control method which makes efficient use of all available fuel, including combustible products generated by the fuel processor prior to fuel cell operation and anode effluent and cathode effluent from the fuel cell during fuel cell operation. The inventive method controls the combustor having dual fuel and multiple fuel composition inlet streams as well as dual air flow streams.

TABLE 1

Operating Equations (1) $P_C = P_{MeOH} + P_{H2}$ (KW)
where: $P_C$ = combustor power, $P_{MeOH}$ = power from MeOH, $P_{H2}$ = power from hydrogen (2) $P_{MeOH} = 636\, n_{MeOH}$
where: $n_{MeOH}$ = molar flow of MeOH (3) $P_{H2} = 242\, n_{H2}$
where: $n_{H2}$ = molar flow of hydrogen (4) $n_{CATH} = (n_{MeOH} \cdot dh(MeOH) - n_{CO2} \cdot dh(CO2) + n_{H2} \cdot dh(H2) + n_{H2O} \cdot dh(H_2O) + n_{N2} \cdot dh(N_2))/dh(CATH)$
where: $n_{CATH}$ = molar flow of cathode input to combustor; $n_{CO2}$, $n_{H2}$, $n_{H2O}$, $n_{N2}$ = molar flows of $CO_2$, $H_2$, $H_2O$, and $N_2$, respectively, in the anode input to the combustor; $dh(X)$ = difference of the enthalpy for given component X from inlet of combustor to outlet of combustor.

(5) $dh(MeOH) = H(MeOH, T_{MeOH}) - H(CO_2, T_{CRT}) - 2 \cdot H(H_2O, T_{CRT}) + 1.5 \cdot H(O_2, T_{CRT})$
where: $H(X, T_y)$ = enthalpy of component X at temperature $T_y$, $T_{MeOH}$ = temperature of liquid MeOH supp;ied to vaporizer, $T_{CRT}$ = combustor reaction temperature (combustion out temperature)

(6) $dh(CO_2) = H(CO_2, Tan) - H(CO_2, T_{CRT})$
where: Tan = anode temperature into combustor (7) $dh(H_2) = H(H_2, Tan) + 0.5 \cdot H(O_2, T_{CRT}) - H(H_2O, T_{CRT})$ (8) $dh(H_2O) = H(H_2O, Tan) - H(H_2O, T_{CRT})$ (9) $dh(N_2) = H(N_2, Tan) - H(N_2, T_{CRT})$

(10) $dh(CATH) = \%\, O_2 \cdot dh(CATH\, O_2) + \%\, N_2 \cdot dh(CATH\, N_2) + \%\, H_2O \cdot dh(CATH\, H_2O)$
where: $\%\, O_2$, $\%\, N_2$ and $\%\, H_2O$ are mole fractions (percentages) of oxygen, nitrogen and water, respectively, in the cathode input.

(11) $dh(CATH\, O_2) = H(O_2, T_{CA}) - H(O_2, T_{CRT})$
where: $T_{CA}$ = Cathode Input Temperature

(12) $dh(CATH\, N_2) = H(N_2, T_{CA}) - H(N_2, T_{CRT})$

(13) $dh(CATH\, H_2O) = H(H_2O, T_{CA}) - H(H_2O, T_{CRT})$

(14) $m_{CATH} = n_{CATH} \cdot mw_{CATH}$
where: $mw_{CATH}$ = molecular weight of cathode input stream

(15) $mw_{CATH} = \%\, O_2 \cdot mw_{O2} + \%\, N_2 \cdot mW_{N2} + \%\, H_2O \cdot mw_{H2O}$

(16) $M_{MeOH} = n_{MeOH} \cdot mw_{MeOH}$

What is claimed is:

1. A method of operating a combustor in a fuel cell system, the method comprising the steps of:

determining a thermal load demand for a fuel processor in the fuel cell system based on an operating state of said fuel processor;

selectively supplying a first fuel stream to a combustor in the fuel cell system, said first fuel stream being an anode effluent exhausted from a fuel cell in the fuel cell system;

selectively supplying a second fuel stream to said combustor, said second fuel stream being reformate from said fuel processor;

determining a thermal output capacity of said combustor combusting said first and second fuel streams supplied to said combustor; and selectively supplying a third fuel stream to said combustor such that combustion of said first, second and third fuel streams in said combustor produces a thermal output from said combustor sufficient to meet said thermal load demand of said fuel processor, said third fuel stream being a hydrocarbon fuel.

2. The method of claim 1, further comprising the steps of:

determining an enthalpy of said fuel streams supplied to said combustor;

selecting a desired output temperature of said combustor; and selectively supplying an oxidant stream to said combustor to balance said enthalpy of said fuel streams and to operate said combustor at said output temperature.

3. The method of claim 2, wherein:

said step of selectively supplying an oxidant stream comprises selectively supplying first and second oxidant streams to said combustor to balance said enthalpy of said fuel streams and to operate said combustor at said output temperature, and said first oxidant stream being cathode effluent exhausted from said fuel cell.

4. The method of claim 3, wherein:

said step of selectively supplying first and second oxidant streams comprises regulating said second oxidant stream so that said second oxidant steam is supplied to said combustor only when oxidant within said first oxidant stream is insufficient to balance said enthalpy of said fuel streams and to operate said combustor at said output temperature.

5. The method of claim 2 wherein:

said step of selectively supplying an oxidant stream comprises regulating said oxidant stream by controlling at least one of an output flow of a valve and a speed of a compressor in said oxidant stream.

6. The method of claim 1, further comprising the steps of:

determining if a hydrocarbon fuel stream being supplied to said fuel processor is discontinued; and if said hydrocarbon fuel stream is discontinued, setting a flow rate of an oxidant flow stream to said combustor to a preset flow rate to lower a temperature of said combustor to a preset shutdown temperature.

7. The method of claim 6, further comprising the steps of:

if said hydrocarbon fuel stream is not discontinued, calculating an enthalpy of said first fuel stream and an enthalpy of a cathode effluent from said fuel cell supplied to said combustor; and adjusting a flow rate of an oxidant stream supplied to said combustor to consume all of said first and second fuel streams, said oxidant stream being different from said cathode effluent.

8. The method of claim 1, further comprising the steps of:

comparing at least one measured parameter selected from a combustor catalyst bed temperature, a combustor vaporizer temperature, an inlet oxidant stream temperature to said combustor, an anode effluent inlet temperature, a predetermined temperature rate of change of any of said temperatures, a vaporizer air flow rate, a pressure of said combustor, and a combustor air flow rate with respective preset limits;

determining if any of said measured parameters exceeds said respective preset limit; and discontinuing operation of said combustor if any of said preset limits are violated.

9. The method of claim 1, further comprising the step of:

preheating a catalyst bed in said combustor to a predetermined operating temperature before selectively supplying said fuel streams to said combustor.

10. The method of claim 1, wherein:

before a hydrocarbon fuel is supplied to said fuel processor, said combustor is exclusively supplied with said third fuel stream and with an oxidant stream.

11. The method of claim 1, further comprising the steps of:

before supplying a hydrocarbon fuel to said fuel processor, determining a required thermal output of said combustor to raise a temperature of said fuel processor to a predetermined warm-up temperature;

determining a required third fuel stream flow rate to said combustor to meet said required thermal output; and supplying said required third fuel stream flow rate to said combustor.

12. The method of claim 11, further comprising the steps of:

determining an enthalpy of said third fuel stream; and regulating an oxidant stream flow rate supplied to said combustor to balance said enthalpy of said third fuel stream and to operate said combustor at a predetermined temperature.

13. The method of claim 11, wherein:

before said temperature of said fuel processor reaches or exceeds said warm-up temperature, said third fuel stream and said oxidant stream are supplied exclusively to said combustor.

14. The method of claim 1, further comprising the steps of:

after said fuel processor has reached a predetermined warm-up temperature and produces reformate, supplying all of said reformate from said fuel processor to said combustor;

determining a thermal output of said combustor attributable to combustion of said reformate in said combustor;

determining a required thermal output of said combustor to raise a temperature of said fuel processor to a predetermined run temperature;

calculating a difference between said thermal output of said combustor attributable to combustion of said reformate in said combustor and said required thermal output;

determining a required third fuel stream flow rate to be supplied to said combustor to meet said required thermal output based on said calculated difference; and supplying said third fuel stream flow rate to said combustor so that all of said reformate is combusted and said combustor produces said required thermal output.

15. The method of claim 14, further comprising the steps of:

determining an enthalpy of said reformate and said third fuel stream; and regulating an oxidant stream supplied to said combustor to balance said enthalpies of said reformate and said third fuel stream and to operate said combustor at a predetermined temperature.

16. The method of claim 1, further comprising the steps of:

after said fuel processor produces reformate of a predetermined quality, supplying all of said reformate from said fuel processor to said fuel cell;

determining a run thermal load demand of said fuel processor during a run mode of operation;

determining a required thermal output of said combustor to meet said run thermal load demand of said fuel processor;

determining a thermal output of said combustor attributable to combustion of said first fuel stream in said combustor;

calculating a difference between said thermal output of said combustor attributable to combustion of said first fuel stream and said required thermal output;

determining a required third fuel stream flow rate to meet said required thermal output based on said calculated difference; and supplying said third fuel stream flow rate to said combustor so that all of said first fuel stream is combusted and said combustor generally produces said required thermal output.

17. The method of claim 16, further comprising the steps of:

determining an enthalpy of said first fuel stream;

determining an enthalpy of said third fuel stream; and selectively supplying an oxidant stream to said combustor to balance said enthalpies of said first and third fuel streams and to operate said combustor at a predetermined temperature.

18. The method of claim 17, wherein said step of selectively supplying an oxidant stream comprises selectively supplying first and second oxidant streams to said combustor, said first oxidant stream being anode effluent from said fuel cell, and further comprising:

regulating said second oxidant stream so that said second oxidant steam is supplied to said combustor only when oxidant within said first oxidant stream is insufficient to balance said enthalpies of said first and third fuel streams and to operate said combustor at said predetermined temperature.

19. The method of claim 16, wherein:

said step of determining a run thermal load demand is based upon a desired reformate output of said fuel processor and a desired operation temperature of said fuel processor.

20. The method of claim 1, further comprising the steps of:

before selectively supplying said fuel streams to said combustor, preheating a catalyst bed in said combustor to a predetermined operating temperature;

before supplying a hydrocarbon fuel to said fuel processor, determining a first required thermal output of said combustor to raise a temperature of said fuel processor to a predetermined warm-up temperature;

determining a required first flow rate of said third fuel stream to be supplied to said combustor to meet said first required thermal output;

supplying said first flow rate of said third fuel stream to said combustor so that said combustor generally produces said first required thermal output;

after said fuel processor has reached said predetermined warm-up temperature and produces reformate, supplying all of said reformate from said fuel processor to said combustor;

determining a thermal output of said combustor attributable to combustion of said reformate in said combustor;

determining a second required thermal output of said combustor to raise said temperature of said fuel processor to a predetermined run temperature;

calculating a first difference between said thermal output of said combustor attributable to combustion of said reformate in said combustor and said second required thermal output;

determining a required second flow rate of said third fuel stream to be supplied to said combustor to meet said second required thermal output based on said first difference;

supplying said second flow rate of said third fuel stream to said combustor so that all of said reformate is combusted and said combustor generally produces said second required thermal output;

after the fuel processor produces reformate of a predetermined quality, supplying all of said reformate from said fuel processor to said fuel cell;

determining a run thermal load demand of said fuel processor during a run mode of operation;

determining a third required thermal output of said combustor to meet said run thermal load demand of said fuel processor;

determining a thermal output of said combustor attributable to combustion of said first fuel stream in said combustor;

calculating a second difference between said thermal output of said combustor attributable to combustion of said first fuel stream and said third required thermal output;

determining a required third flow rate of said third fuel stream to meet said third required thermal output based on said second difference; and supplying said third flow rate of said third fuel stream to said combustor so that all of said first fuel stream is combusted and said combustor generally produces said third required thermal output.

21. The method of claim 20, further comprising the steps of:

after determining said required first flow rate of said third fuel stream, determining an enthalpy of said first flow rate of said third fuel stream;

selectively supplying an oxidant stream to said combustor to balance said enthalpy of said first flow rate of said third fuel steam and to operate said combustor at a first predetermined temperature while generally producing said first required thermal output;

after determining said required second flow rate of said third fuel stream, determining an enthalpy of said second flow rate of said third fuel stream and an enthalpy of said reformate;

selectively supplying said oxidant stream to said combustor to balance said enthalpies of said second flow rate of said third fuel cell and of said reformate and to operate said combustor at a second predetermined temperature while generally producing said second required thermal output;

after determining said required third flow rate of said third-fuel stream, determining an enthalpy of said third flow rate of said third fuel stream and an enthalpy of said first fuel stream; and selectively supplying said oxidant stream to said combustor to balance said enthalpies of said third flow rate of said third fuel stream and of said first fuel stream and to operate said combustor at a third predetermined temperature while generally producing said third required thermal output.

22. The method of claim 20, further comprising the steps of:

determining if a hydrocarbon fuel stream being supplied to said fuel processor is discontinued; and if said hydrocarbon fuel stream is discontinued, setting a flow rate of an oxidant flow stream to said combustor to a preset flow rate to lower a temperature of said combustor to a preset shutdown temperature.

23. The method of claim 22, further comprising the steps of:

if said hydrocarbon fuel stream is not discontinued, calculating an enthalpy of said first fuel stream and an enthalpy of a cathode effluent from said fuel cell supplied to said combustor; and adjusting a flow rate of an oxidant stream supplied to said combustor to consume all of said first and second fuel streams, said oxidant stream being different from said cathode effluent.

24. A method of operating a combustor to heat a fuel processor in a fuel cell apparatus in which the fuel processor generates hydrogen from a hydrocarbon fuel for supplying a fuel cell, the fuel cell discharging hydrogen containing anode effluent and oxygen containing cathode effluent, the method comprising the steps of:

providing first and second fuel streams to the combustor, the first fuel stream being a hydrocarbon fuel stream, the second fuel stream selected from the group consisting of reformate from the fuel processor and the anode effluent from the fuel cell;

providing first and second air flow streams to the combustor, the first air flow stream being from a first air source, the second air flow stream being the cathode effluent from the fuel cell;

determining a power input requirement of the fuel processor;

determining an output power of the combustor to support the determined power input requirement of the fuel processor;

regulating a quantity of at least one of the first and second fuel streams and the first and second air flow streams to the combustor to provide a power output from the combustor to meet the determined power input requirement of the fuel processor;

before supplying the first fuel stream to the combustor, preheating a catalyst bed in the combustor to a predetermined operating temperature;

before supplying a hydrocarbon fuel to the fuel processor, calculating a first power output requirement of the combustor to raise a temperature of the fuel processor to a predetermined warm-up temperature;

determining a required first flow rate of the first fuel stream to meet the calculated first power output requirement of the combustor;

determining an enthalpy of the first flow rate of the first fuel stream and using an enthalpy balance to determine a first flow rate of the first air flow stream to the combustor to provide the calculated first power output requirement of the combustor;

supplying the first flow rate of the first air flow steam to the combustor;

supplying the first flow rate of the first fuel stream to the combustor measuring the temperature of the fuel processor;

regulating the first flow rate of the first air flow stream supplied to the combustor to balance the enthalpy of the first flow rate of the first fuel stream and to operate the combustor at a predetermined temperature;

after the fuel processor has reached the predetermined warm-up temperature and produces reformate from a hydrocarbon fuel and air, diverting all of the reformate from the fuel processor to the combustor;

determining a power output of the combustor attributable to combustion of the reformate in the combustor;

calculating a second power output requirement of the combustor to raise the temperature of the fuel processor to a predetermined start-up temperature;

calculating a first difference between the determined power output of the combustor attributable to combustion of the reformate in the combustor and the calculated second power output requirement;

determining a required second flow rate of the first fuel stream to be supplied to the combustor to meet the second power output requirement based on the calculated first difference;

determining a required second flow rate of the first air flow stream to be supplied to the combustor to meet the second power output requirement;

supplying the second flow rate of the first air flow stream and the second flow rate of the first fuel stream to the combustor;

regulating the second flow rate of the first air flow stream to balance an enthalpy of combustion occurring in the combustor;

after the fuel processor has reached the predetermined start-up temperature, diverting all of the fuel processor reformate to the fuel cell;

determining a power requirement and run temperature of the fuel processor during a run mode of operation;

determining an enthalpy of the anode effluent and the cathode effluent from the fuel cell;

communicating the anode effluent and the cathode effluent to the combustor;

calculating a third power output requirement of the combustor to operate the fuel processor at the determined run temperature; determining a power output of the combustor attributable to combusting the anode effluent in the combustor;

calculating a second difference between the power output of the combustor attributable to combusting the anode effluent in the combustor and the third power output requirement;

determining a required third flow rate of the first fuel stream to meet the third power output requirement based on the calculated second difference;

adding the anode effluent and the required third flow rate of the first fuel stream and performing an enthalpy balance to determine a required quantity of oxidant flow from the first and second air flow streams to meet the required third power output requirement of the combustor;

calculating a required third flow rate of the first air flow stream by subtracting the cathode effluent from the required quantity of oxidant flow;

supplying the third flow rate of the first fuel stream and the third flow rate of the first air flow stream to the combustor; and adjusting the third flow rate of the first air flow stream to the combustor to operate the fuel processor at the determined run temperature.

25. The method of claim 24, further comprising the steps of:

determining if the supply of the first fuel stream to the fuel processor is discontinued; and if the first fuel stream is discontinued, setting a flow rate of the first air flow stream to the combustor to a preset flow rate to lower a combustor temperature to a preset shutdown temperature.

26. The method of claim 25, further comprising the steps of:

if the first fuel stream is not discontinued, adjusting the third flow rate of the first air flow stream to the combustor to consume all of the anode effluent and the first fuel stream.

* * * * *